UNITED STATES PATENT OFFICE.

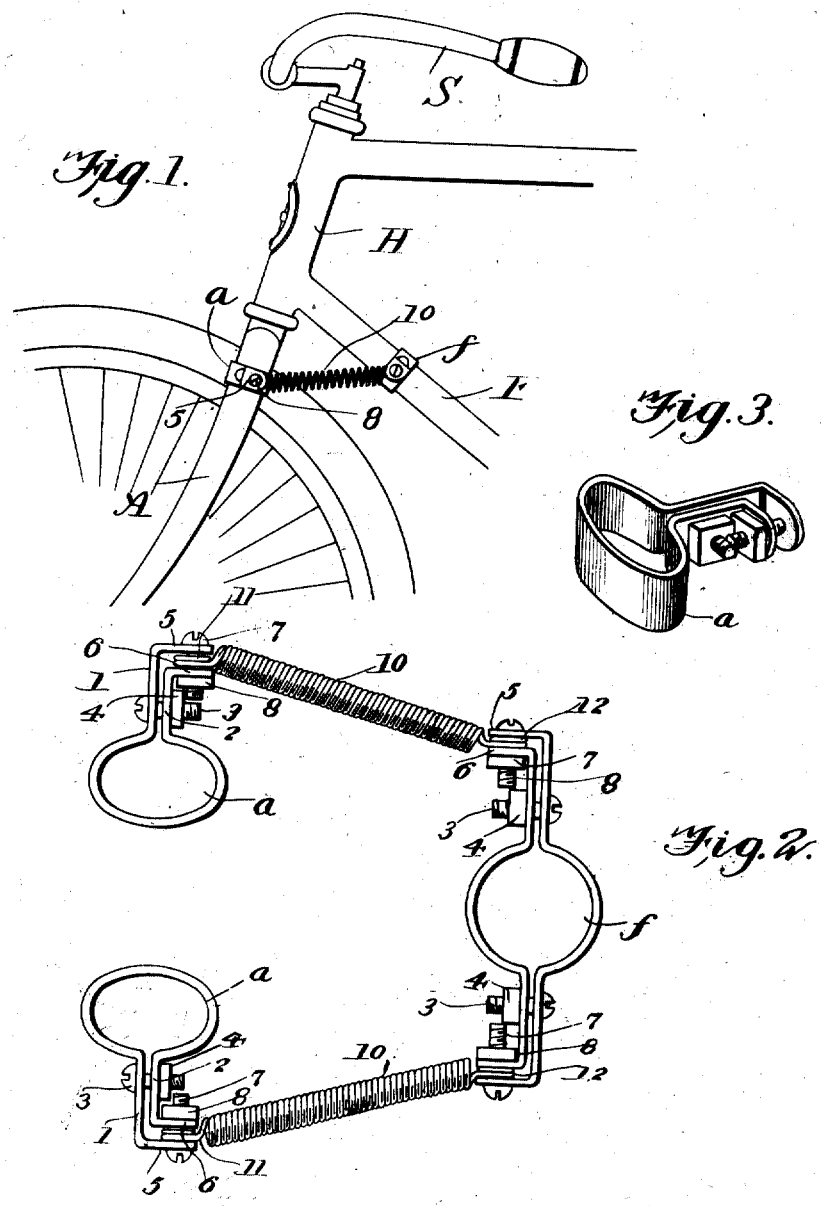

WILLIAM SCHRIVER, OF SPIELERVILLE, ARKANSAS.

CYCLE STEERING ATTACHMENT.

1,230,801.   Specification of Letters Patent.   Patented June 19, 1917.

Application filed February 2, 1917. Serial No. 146,153.

*To all whom it may concern:*

Be it known that I, WILLIAM SCHRIVER, a citizen of the United States, residing at Spielerville, in the county of Logan and State of Arkansas, have invented new and useful Improvements in Cycle Steering Attachments, of which the following is a specification.

This invention relates to velocipedes; and more especially to means for automatically governing the steering wheels of bicycles, motor-cycles, and the like, by holding the fork yieldingly in such position relative to the frame that the axle of the steering wheel will be transverse to the proposed line of movement.

The object of the invention is to mechanically center the steering wheel on the line of progress, so that the rider need give less attention to his machine when proceeding straight ahead and may take his hands off the handle bar, and also in order that when the machine is laid up against a wall, tree box, or the like, it will not be so readily acted upon by a blast of wind which frequently causes it to topple over to the injury of the machine or its nickeling or painting if it be a bicycle, and sometimes to the injury of the mechanism or motor if the machine be a motor-cycle. While I have shown the invention as applied to a two-wheeled machine, it could obviously be applied to the steering mechanism of a machine with more wheels than two, such as a tri-cycle or an automobile, by adapting its construction thereto. I do not, therefore, wish to be limited strictly to the application of this invention to a bicycle or velocipede.

One object of the invention is to produce an improved form of clip for attachment at one point to the frame of any suitable machine, and carrying means at another point whereby some additional member such as a spring may be attached to the clip.

Another object of the invention is to produce means in a clip having two bolts whereof one tightens the parts of the clip at one point and the other tightens the parts at another point, whereby the nut of one bolt will act as a nut lock for the nut of the other.

Other objects will appear in the following specification, reference being had to the accompanying drawings wherein;—

Figure 1 is a side elevation of a portion of a bicycle with my improvement applied.

Fig. 2 is an enlarged plan view of the improvement or attachment alone.

Fig. 3 is a yet further enlarged perspective detail of the clip for one of the fork-arms, showing how one nut acts as a nut lock for the other.

In the drawings the letter F designates the framework of a bicycle, in whose head H is journaled the stem of the fork having two arms A, and S is the ordinary handle bar or steering mechanism. Substantially the same structure is followed in motor cycles, and my invention as described and shown herein is adapted thereto although of course by slight modifications it could be applied to the steering mechanism of an automobile or a tri-cycle.

Coming now to the details of the invention itself, as best seen in Figs. 2 and 3, the same comprises broadly a double clip, $f$, for attachment to the frame F of the machine, a pair of single clips $a$ for attachment respectively to the arms of the fork A of the machine, and a spring connecting each extremity of the double clip with one of the single clips as shown. When the single clips are fastened to the fork arms and the double clip is fastened to the frame at a point on the latter, the springs are put under slight tension, and therefore they will balance each other and tend normally to hold the front wheel in alinement with the rear wheel and along the line of progress. This permits the rider more readily to take his hands off the handle bar and allow the machine to steer itself, although the parts should be so adjusted that the tension of the springs is not too great to permit him to readily steer the bicycle by hand power or perhaps by moving his body slightly to and fro as well known to riders of this type of machine. In other words, the invention becomes a centering device for holding the steering wheel normally alined with the line of movement. The loops of the several clips will probably be lined with leather, tire-tape, or some material which will prevent the metallic parts from scratching the nickel or paint of the machine parts, but this need not be amplified.

Referring now more especially to Fig. 3, each clip $a$ comprises a single body member of strap metal and two bolts. The body 110 member is looped at about the center of its length as indicated, beyond which its parts are brought together in a long arm 1 and a short arm 2, pierced with registering holes through which passes a bolt 3 having a nut 4. The ends of the arms are turned into feet 5 and 6 spaced slightly from each other, standing at right angles to the length of the arms, and pierced with registering holes through which passes a bolt 7 having a nut 8. The latter when in place lies in contact with the short arm 2 which serves as a nutlock therefor. The proportion and disposition of parts are such that when the bolts are applied as seen in this view, one bolt passes through the arms with its threaded end underlying the feet and the other bolt passes through the feet with its threaded end directed toward the threaded end of the first bolt, and when the two fastening devices are put in place, one serves a nut lock for the other. In other words the operation of connecting the parts will be to hold each nut while the body of the bolt is screwed through the registering openings and the nut. Finally there is provided a helical spring 10 having one end looped into an eye 11 which engages the body of the last-named bolt between the feet. The same construction prevails in connection with the other single clip.

Referring now more particularly to Fig. 2, the double clip is made up of two members of strap metal each of which is arched at its midlength to produce one-half of the eye which surrounds the frame F, and to either side of the eye the construction is the same as that above described. That is to say, there are two overlying arms pierced with registering openings through which passes the shank of one bolt, and there are two right-angular feet pierced with registering openings through which passes the shank of the other bolt, this shank receiving a second loop or eye 12 at the opposite end of the helical spring 10, and the nut of one bolt acting as a nut lock for the nut of the other if they are disposed close enough to each other, or perhaps the threaded tip of the bolt through the feet acting as a nut lock for the nut on the other bolt as illustrated. Here again the application of parts must be such that the nuts are held while the bolts are rotated, and for this purpose the head of each bolt is preferably provided with a screw-driver nick as shown. In the use of this device, the parts are applied as indicated in Fig. 1, and the eyes at the extremities of the springs are pivotally mounted on the bolts which pass through them, so that the exact angular disposition of the loops with respect to the parts which they embrace normally puts no tension or twist on the springs, and the double clip will therefore have to be attached at a proper point to the frame bar F to produce such tension as is necessary to make the device work successfully.

What is claimed as new is:—

1. A clip of the class described comprising a loop, parallel arms projecting therefrom and overlapped and pierced with registering holes, right-angular feet at the outer ends of said arms also overlapping each other and pierced with registering holes, and independent fastening devices for the arms and the feet, each including a threaded member passing through a pair of said holes and a nut thereon, the inner arm serving as a lock for the nut of the fastening device through the feet and said device serving as a nut lock for the other device.

2. A clip of the class described comprising a loop, parallel arms projecting therefrom and overlapped and pierced with registering holes, angular feet at the outer ends of said arms also overlapping each other and pierced with registering holes, and independent fastening devices for the arms and the feet, each including a bolt passing through a part of said holes and having a nut, the inner arm serving as a lock for the nut of the fastening device through the feet and the bolt of said device serving as a lock for the nut of the other device.

In testimony whereof I affix my signature.

WILLIAM SCHRIVER.